(12) United States Patent
Choi et al.

(10) Patent No.: US 8,941,688 B2
(45) Date of Patent: Jan. 27, 2015

(54) METHOD OF PROVIDING AUGMENTED CONTENTS AND APPARATUS FOR PERFORMING THE SAME, METHOD OF REGISTERING AUGMENTED CONTENTS AND APPARATUS FOR PERFORMING THE SAME, SYSTEM FOR PROVIDING TARGETING AUGMENTED CONTENTS

(71) Applicant: Electronics and Telecommunications Research Institute, Daejeon (KR)

(72) Inventors: Bum Suk Choi, Daejeon-si (KR); Seung Chul Kim, Daejeon-si (KR); Soon Choul Kim, Daejeon-si (KR); Jung Hak Kim, Daejeon-si (KR); Jeoung Lak Ha, Daejeon-si (KR); Young Ho Jeong, Daejeon-si (KR); Jin Woo Hong, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 343 days.

(21) Appl. No.: 13/646,394

(22) Filed: Oct. 5, 2012

(65) Prior Publication Data
US 2013/0088515 A1    Apr. 11, 2013

(30) Foreign Application Priority Data
Oct. 7, 2011    (KR) .................. 10-2011-0102635

(51) Int. Cl.
*G09G 5/00*    (2006.01)
*H04N 5/222*    (2006.01)
(Continued)

(52) U.S. Cl.
CPC .............. *G09G 5/005* (2013.01); *G06T 19/006* (2013.01); *G06T 19/00* (2013.01); *G06F 3/011* (2013.01);
(Continued)

(58) Field of Classification Search
CPC ....... G06T 19/006; G06T 19/00; G06T 13/40; G06T 13/00; G06T 13/80; G06T 13/20; G06F 3/011; G06F 3/012; G02B 27/017
USPC ............ 345/633, 473; 348/333.02, 563, 564; 715/757; 725/34, 40, 47
See application file for complete search history.

(56) References Cited

U.S. PATENT DOCUMENTS 8,694,520 B1 *  4/2014  Krishnakumar et al. ..... 707/758
2012/0275755 A1 * 11/2012  Southworth ................. 386/200
(Continued)

FOREIGN PATENT DOCUMENTS

KR    10-2011-0057298 A    6/2011
KR    10-2011-0066665 A    6/2011

*Primary Examiner* — Hoang-Vu A Nguyen-Ba
(74) *Attorney, Agent, or Firm* — William Park & Associates Patent Ltd.

(57) ABSTRACT

The system for providing targeting augmented contents includes: an augmented metadata generation apparatus that generates augmented metadata designating specific space and time of broadcast contents as an augmented area; a broadcast content providing apparatus that transmits the augmented metadata to a first broadcast terminal apparatus and transmits the augmented metadata and the broadcast contents to a second broadcast terminal apparatus; a first broadcast terminal apparatus that transmits augmented contents displayed in the augmented area in which the augmented metadata are designated to the augmented content providing apparatus; an augmented content providing apparatus that transmits the augmented contents to a second broadcast terminal apparatus; and a second broadcast terminal apparatus that receives the broadcast contents and the augmented metadata from the broadcast content providing apparatus and receives the augmented contents from the augmented content providing apparatus based on the augmented metadata.

18 Claims, 15 Drawing Sheets

(51) Int. Cl.

| | |
|---|---|
| *H04N 5/445* | (2011.01) |
| *G06F 3/048* | (2013.01) |
| *G06T 19/00* | (2011.01) |
| *G06T 13/00* | (2011.01) |
| *H04N 7/10* | (2006.01) |
| *G06F 3/00* | (2006.01) |
| *G06F 13/00* | (2006.01) |
| *G06F 3/01* | (2006.01) |
| *G06T 13/40* | (2011.01) |
| *G06T 13/80* | (2011.01) |
| *G06T 13/20* | (2011.01) |

(52) U.S. Cl.
CPC ................. *G06T 13/40* (2013.01); *G06T 13/00* (2013.01); *G06T 13/80* (2013.01); *G06T 13/20* (2013.01); *G09G 5/006* (2013.01); *G09G 2354/00* (2013.01); *G09G 2370/10* (2013.01)

USPC ...... 345/633; 345/473; 348/333.02; 348/563; 348/564; 715/757; 725/34; 725/40; 725/47

(56) References Cited

U.S. PATENT DOCUMENTS

| | | | |
|---|---|---|---|
| 2013/0050260 A1* | 2/2013 | Reitan | 345/633 |
| 2013/0083173 A1* | 4/2013 | Geisner et al. | 348/51 |
| 2013/0155307 A1* | 6/2013 | Bilbrey et al. | 348/333.01 |
| 2013/0229433 A1* | 9/2013 | Reitan | 345/633 |
| 2013/0235079 A1* | 9/2013 | Reitan | 345/633 |
| 2013/0249947 A1* | 9/2013 | Reitan | 345/633 |
| 2013/0249948 A1* | 9/2013 | Reitan | 345/633 |
| 2014/0063061 A1* | 3/2014 | Reitan | 345/633 |
| 2014/0111545 A1* | 4/2014 | Damola | 345/633 |

\* cited by examiner

METHOD OF PROVIDING AUGMENTED CONTENTS AND APPARATUS FOR PERFORMING THE SAME, METHOD OF REGISTERING AUGMENTED CONTENTS AND APPARATUS FOR PERFORMING THE SAME, SYSTEM FOR PROVIDING TARGETING AUGMENTED CONTENTS

CROSS-REFERENCE TO RELATED APPLICATIONS

This application claims the benefit of priority of Korean Patent Application No. 10-2011-0102635 filed on Oct. 7, 2011, all of which are incorporated by reference in their entirety herein.

BACKGROUND OF THE INVENTION

1. Field of the Invention

The present invention relates to augmented broadcasting, and more particularly, to a method and an apparatus for outputting broadcast contents by adding user's desired augmented contents to broadcast contents.

2. Related Art

An augmented reality service according to the related art is performed by a method for overlapping additional information on video captured by a camera installed in a mobile device. For example, the method according to the related art is a method that detects a location and a direction of a current user using a GPS sensor, a compass sensor, a gyro sensor of the mobile device when driving the camera of the mobile device and augmented reality applications in order for a user to know a position of a destination while walking along a street and displays a direction of a destination on the video captured by the camera.

Research into augmented broadcasting allowing a viewer to select services provided by an augmented broadcast CP of themselves while increasing reality and liveliness of a viewer by escaping from a method of unilaterally viewing broadcast programs sent out from broadcast stations of digital TV broadcasting by applying the augmented technology to broadcasting so as to naturally fuse additionally augmented contents has been progressed. To this end, a TV and a portable receiving terminal (hereinafter, referred to as a broadcast terminal apparatus) need to receive augmented contents capable of augmenting the broadcast programs in addition to the broadcast programs (hereinafter, referred to as broadcast contents) according to the related art that are sent out from the broadcast stations. The broadcast stations may send out augmented contents relating to the broadcast programs and may send out metadata relating to a method for allowing a received terminal to secure and output augmented contents together with the broadcast programs.

As such, a data broadcast technology according to the related art may additionally provide information relating to program production but provide only additional information to be provided to a viewer by a producer at the time of producing the broadcast programs. Alternatively, there may be a case in which addresses on the Internet relating to the broadcast programs are provided. However, a range of the information is not sufficient. That is, a viewer wants to more lively feel a sense of realism as well as general information relating to viewing programs among the broadcast programs and wants to change a method for broadcasting output from a viewer's terminal into his/her desired method. However, the related art is insufficient to satisfy the user' desire.

Therefore, a need exists for a technology capable of allowing a viewer to know more abundant information relating a production of broadcast programs and receive his/her desired information in addition to information unilaterally provided from broadcast stations or inform information to be informed to other users through broadcast programs by using both of an augmented reality technology and a broadcast technology.

SUMMARY OF THE INVENTION

The present invention has been made in an effort to provide a method for previously registering augmented contents to be displayed in a specific area of broadcast contents viewed by unspecified viewers as user's desired contents and allowing other specific viewers to view the previously registered contents together with broadcast contents.

In addition, the present invention has been made in an effort to provide an apparatus for previously registering augmented contents to be displayed in a specific area of broadcast contents viewed by unspecified viewers as user's desired contents and allowing other specific viewers to view the previously registered contents together with broadcast contents.

In an aspect, a system for providing targeting augmented contents is provided; The system includes: an augmented metadata generation apparatus that generates augmented metadata designating specific space and time of broadcast contents as an augmented area; a broadcast content providing apparatus that transmits the augmented metadata to a first broadcast terminal apparatus and transmits the augmented metadata and the broadcast contents to a second broadcast terminal apparatus; a first broadcast terminal apparatus that transmits augmented contents displayed in the augmented area in which the augmented metadata are designated to the augmented content providing apparatus; an augmented content providing apparatus that transmits the augmented contents to a second broadcast terminal apparatus; and a second broadcast terminal apparatus that receives the broadcast contents and the augmented metadata from the broadcast content providing apparatus and receives the augmented contents from the augmented content providing apparatus based on the augmented metadata.

In another aspect, a method for providing augmented contents is provided. The method includes: receiving augmented contents to be displayed in an augmented area of broadcast contents and targeting broadcast terminal apparatus information transmitting the augmented contents from a first broadcast terminal apparatus; receiving an augmented content request requesting the augmented contents from a second broadcast terminal apparatus; determining whether the terminal apparatus directed by a targeting broadcast terminal apparatus information coincides with the second broadcast terminal apparatus transmitting the augmented content request; searching the augmented contents corresponding to the augmented content request; and transmitting the augmented contents to the second broadcast terminal apparatus. The targeting broadcast terminal apparatus information may include at least one of single individual broadcast terminal apparatus information, a plurality of individual broadcast terminal apparatus information, and similar terminal apparatus group category information. The targeting broadcast terminal apparatus information may include any broadcast terminal apparatus information designating any broadcast terminal apparatus requesting the reception of the augmented contents. The transmitting of the augmented contents to the second broadcast terminal apparatus may end before the second broadcast terminal apparatus starts to receive the broadcast contents.

In still another aspect, a method for registering augmented contents is provided. The method includes: receiving augmented metadata from a broadcast contents providing apparatus; parsing the augmented metadata; selecting augmented contents based on the parsed augmented metadata; generating targeting broadcast terminal apparatus information directing a targeting broadcast terminal apparatus transmitting the augmented contents; and transmitting the augmented contents and the targeting broadcast terminal apparatus information to an augmented contents providing apparatus. The augmented metadata may include at least one of an augmented area ID, augmented area space information, augmented area time information, augmented content information, augmented content representation information, and augmented content interaction information. The augmented content representation information may include at least one of a size, a font, a color, transparency, and a fade in or fade out effect displaying the augmented contents in the augmented area, and the augmented content interaction information may include an input method of a user and event information generated by the input method. The method may further include: generating the setting metadata designating a method for representing augmented contents in the augmented area of the broadcast contents based on the augmented metadata, wherein in the transmitting of the augmented contents and the targeting broadcast terminal apparatus information to the augmented content providing apparatus, the setting metadata is further transmitted to the augmented content providing apparatus. The generating of the setting metadata may include: outputting all the selectable augmented content representation information based on the augmented metadata; selecting at least one of the augmented content representation information through a user interface; and generating the setting metadata based on selected results.

DESCRIPTION OF EXEMPLARY EMBODIMENTS

Figure 1:
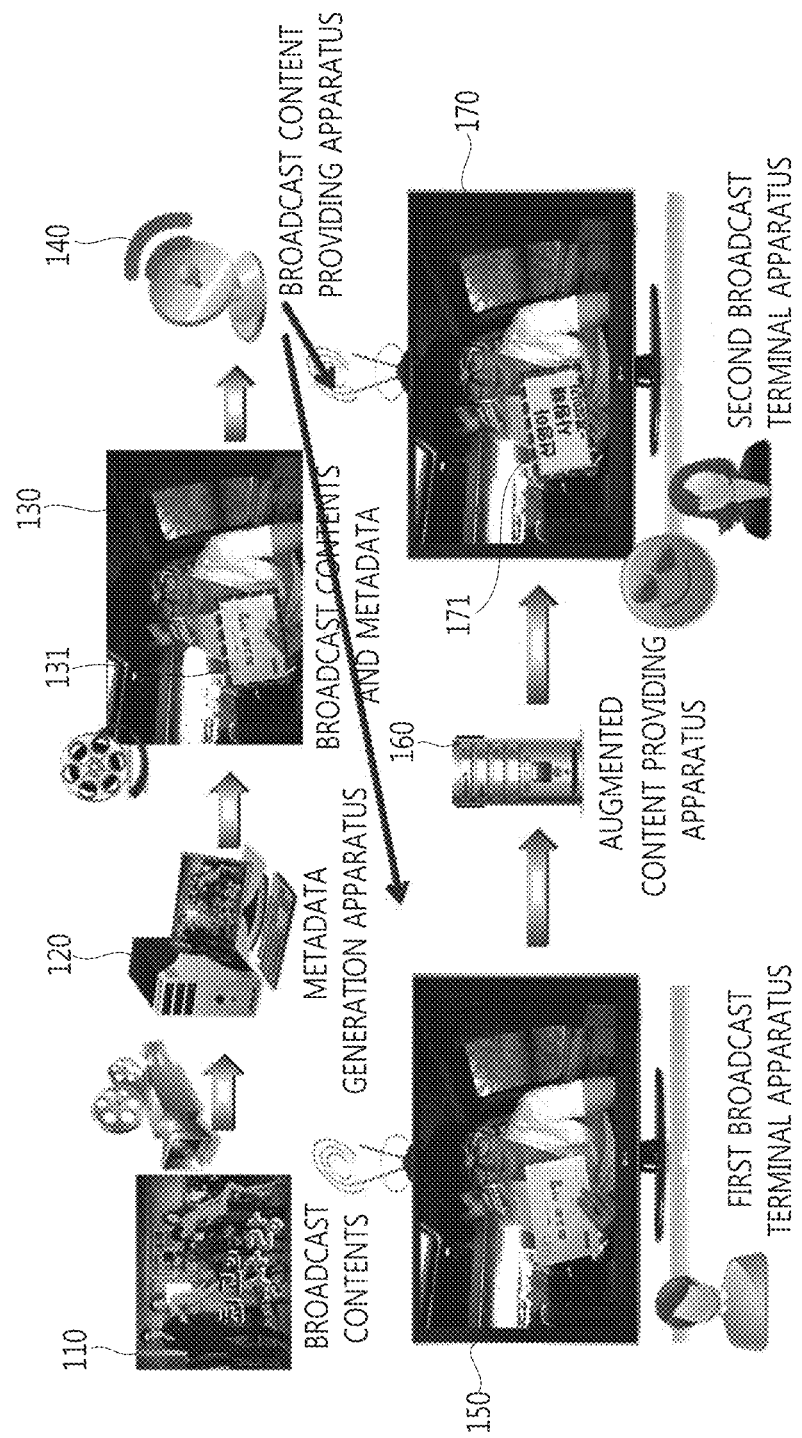
FIG. 1 is a conceptual diagram of a system for providing targeting augmented contents according to an exemplary embodiment of the present invention.

Since the present invention may be variously modified and have several exemplary embodiments, specific exemplary embodiments will be shown in the accompanying drawings and be described in detail.

However, it is to be understood that the present invention is not limited to the specific exemplary embodiments, but includes all modifications, equivalents, and substitutions included in the spirit and the scope of the present invention.

Terms used in the specification, 'first', 'second', etc., may be used to describe to various components, but the components are not to be construed as being limited to the terms. That is, the terms are used to distinguish one component from another component. Therefore, the first component may be referred to as the second component, and the second component may be referred to as the first component. The term 'and/or' includes a combination of a plurality of items or any one of a plurality of terms.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present invention will be described in more detail with reference to the accompanying drawings. In order to facilitate the general understanding of the present invention in describing the present invention, through the accompanying drawings, the same reference numerals will be used to describe the same components and an overlapped description of the same components will be omitted.

System for Providing Targeting Augmented Contents

FIG. 1 is a conceptual diagram of a system for providing targeting augmented contents according to an exemplary embodiment of the present invention. Hereinafter, a concept of a system for providing targeting augmented contents according to an exemplary embodiment of the present invention will be described with reference to FIG. 1.

As shown in FIG. 1, a system for providing targeting augmented contents according to an exemplary embodiment of the present invention first produces broadcast contents 110. A case in which characters of the broadcast contents 110 hold pickets, viewer's desired messages are posted on the pickets, and then, the messages are displayed to other users wanting to see the messages will be described by way of example. The broadcast contents 110 may be produced by a broadcast station, a content provider, a broadcast provider, a content producer, and the like. When the broadcast contents 110 are produced, a metadata generation apparatus 120 generates augmented metadata relating to the broadcast contents 110. The augmented metadata directs information on an augmented area 131 that means a spatio-temporal area in which the augmented contents are displayed on the broadcast contents 110.

That is, the augmented area 131 is set by designating specific space and time of the broadcast contents 110. In this case, viewer's desired augmented contents can be displayed through the augmented area 131. As shown in FIG. 1, the broadcast contents 110 may be dramas and the temporal area designated by the metadata may be designated start time and end time of a scene in which a character of a drama holds a picket. The spatial area may be designated as a portion of the picket held by the character.

The broadcast contents 110 and the augmented metadata are transmitted to a broadcast content providing apparatus 140. When the broadcast content providing apparatus 140 transmits the augmented metadata to a first broadcast terminal apparatus, the first broadcast terminal apparatus acquires information on the augmented area 131. When a first viewer using a first broadcast terminal apparatus 150 allows his/her desired augmented contents (image, text, moving picture, and the like) in the augmented area to be displayed to a second viewer using a second broadcast terminal apparatus 170, the first broadcast terminal apparatus 150 transmits his/her desired augmented contents (image, text, moving pictures, and the like) to an augmented content providing apparatus 160.

The broadcast content providing apparatus transmits the broadcast contents and the augmented metadata to the second broadcast terminal apparatus 170, the second broadcast terminal apparatus 170 transmits an augmented contents request to the augmented content providing apparatus 160 based on the augmented metadata, and the first broadcast terminal apparatus 150 receives the previously transmitted augmented contents from the augmented content providing apparatus 160. Next, when the broadcast contents 110 are reproduced, the broadcast contents 110 are displayed by overlapping the augmented contents in the augmented area 131 of the broadcast contents. Therefore, the message that wants to be delivered to the second viewer by the first viewer is displayed on the picket held by the character of the drama, such that the message delivery is more efficiently performed.

Figure 2:
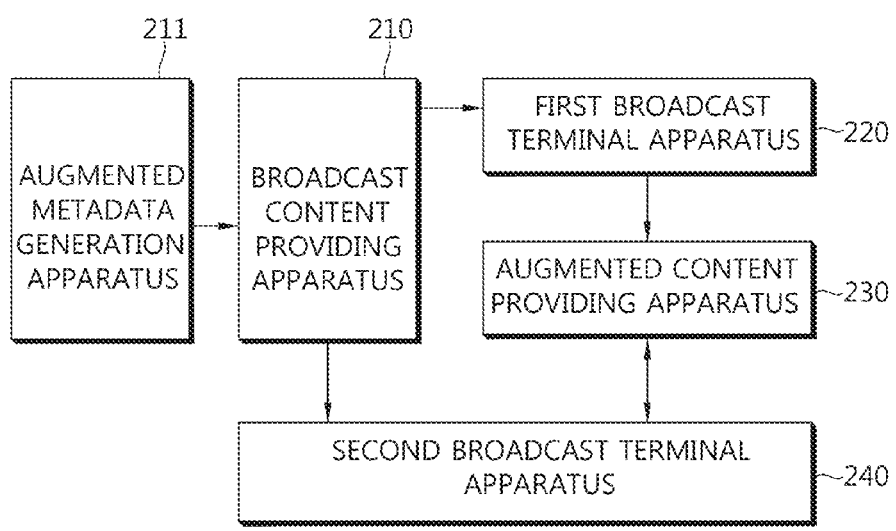
FIG. 2 is a configuration diagram of the system for providing targeting augmented contents of FIG. 1.

FIG. 2 is a configuration diagram of the system for providing targeting augmented contents of FIG. 1.

As shown in FIG. 2, the system for providing targeting augmented contents shown in FIG. 1 includes an augmented metadata generation apparatus 211, a broadcast content providing apparatus 210, a first broadcast terminal apparatus 220, an augmented content providing apparatus 230, and a second broadcast terminal apparatus 240. Functions of each apparatus configuring the system will be described with reference to FIG. 1. Both of the first broadcast terminal apparatus 220 and the second broadcast terminal apparatus 230 are broadcast terminal apparatuses. In the specification, for convenience of explanation, an apparatus for transmitting the augmented contents to the augmented content providing apparatus 230 is referred to as the first broadcast terminal apparatus 220 and an apparatus for receiving augmented contents from the augmented content providing apparatus 230 is referred to as the second broadcast terminal apparatus 240, and vice versa.

Figure 3:
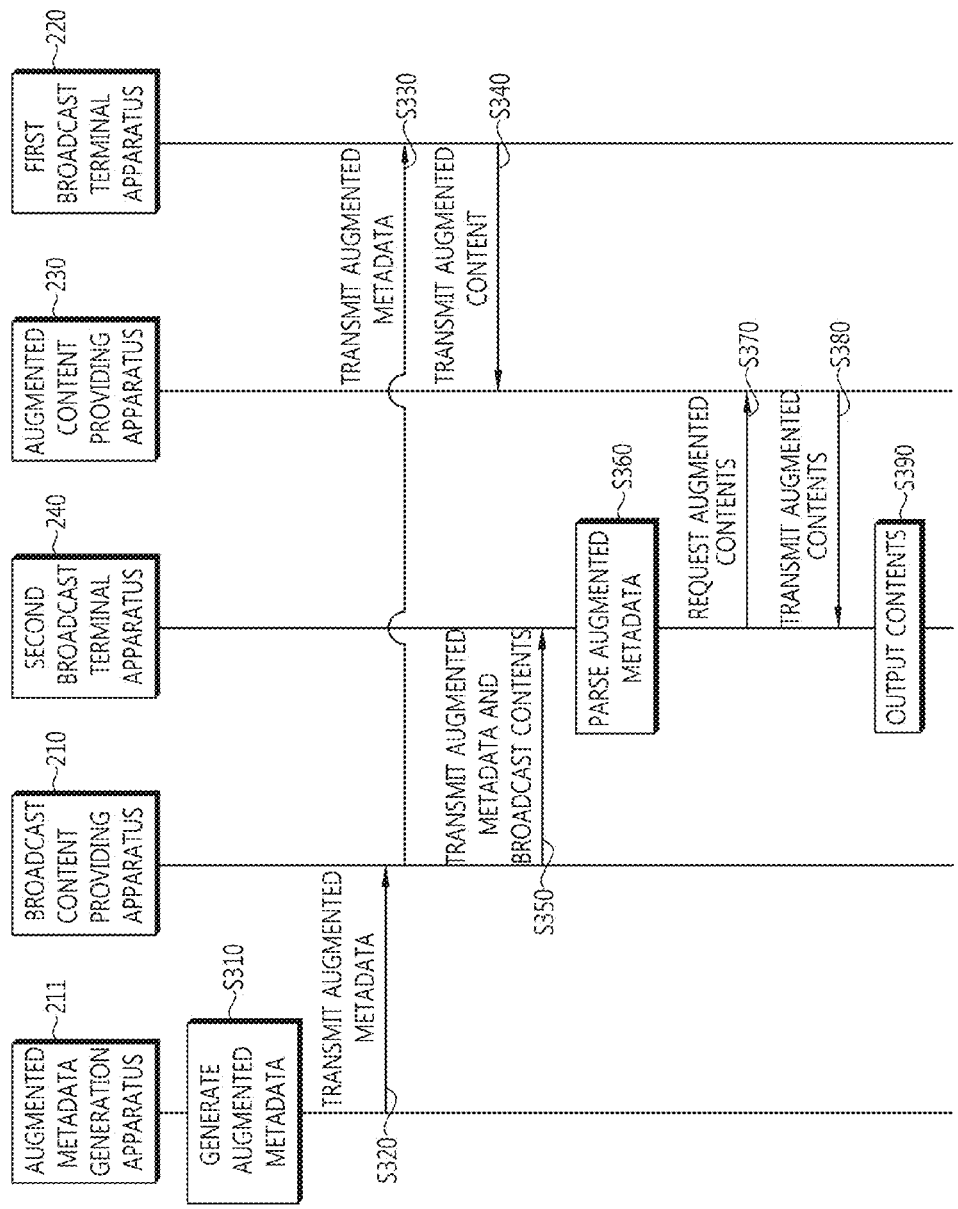
FIG. 3 is an information flow chart among components of FIG. 2.

FIG. 3 is an information flow chart among components of FIG. 2.

As shown in FIG. 3, the augmented metadata generation apparatus 211 generates the augmented metadata that designates the specific space and time of the broadcast contents as the augmented area (S310). The augmented metadata are transmitted to the broadcast content providing apparatus 210 (S320) and the broadcast content providing apparatus 210 transmits the augmented metadata to the first broadcast terminal apparatus 220 (S330). Therefore, the first broadcast terminal apparatus 220 may have the information on the augmented area of the broadcast contents and may select the augmented contents to be displayed in the augmented area. The augmented contents include various multimedia data such as image, text, moving pictures, and the like. When the augmented contents are selected, the registration of the augmented contents complete by transmitting the augmented contents to the augmented content providing apparatus 230 (S340).

Meanwhile, the broadcast content providing apparatus 210 transmits the augmented metadata and the broadcast contents to the second broadcast terminal apparatus 240 (S350). The second broadcast terminal apparatus 240 parses the augmented meta data (S360) and requests the augmented contents to the augmented content providing apparatus 230 based on the augmented metadata (S370). The augmented content providing apparatus 230 receiving the augmented contents request transmits the augmented contents to the second broadcast terminal apparatus 240 (S380). Therefore, the second broadcast terminal apparatus 240 secures both of the broadcast contents and the augmented contents and outputs the broadcast contents and the augmented contents as previously defined by the augmented metadata (S390).

Method for Providing Broadcast Contents

Figure 4:
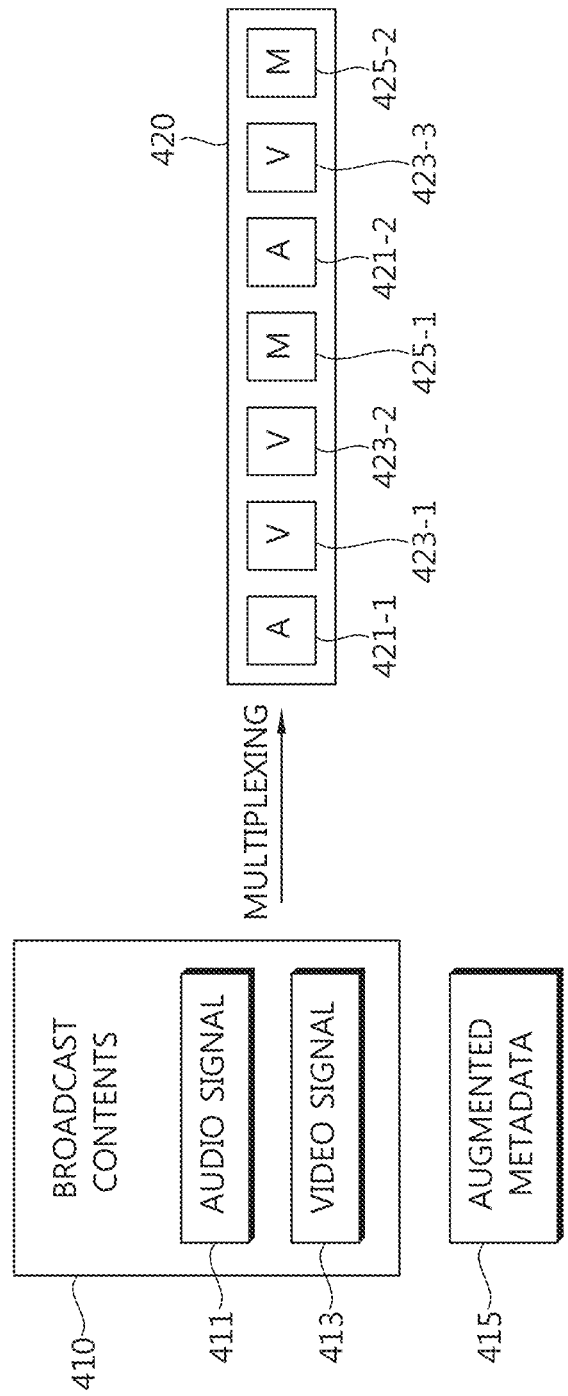
FIG. 4 is a configuration diagram of broadcast contents and transmission streams of a broadcast content providing apparatus according to an exemplary embodiment of the present invention.

FIG. 4 is a configuration diagram of broadcast contents, augmented metadata, and transmission streams of broadcast content providing apparatus according to an exemplary embodiment of the present invention.

A method 210 for providing broadcast contents according to an exemplary embodiment of the present invention generates the augmented metadata that designates the specific space and time of the broadcast contents as the augmented area, generates broadcast content streams based on the broadcast contents, and augmented metadata streams based on the augmented metadata. The broadcast contents streams and the augmented metadata streams may be multiplexed with an MPEG-2 transmission stream (TS). Next, as described above, the multiplexed broadcast content streams and augmented metadata streams are transmitted to the broadcast terminal apparatus.

Here, broadcast content packets are generated based on the broadcast content streams, augmented metadata packets are generated based on the augmented metadata streams, and the broadcast content streams and the augmented metadata streams are transmitted to the broadcast terminal apparatus by scheduling the broadcast content packets and the augmented metadata packets based on time stamp information.

As shown in FIG. 4, broadcast contents 410 may include an audio signal 411 and a video signal 413, generate an audio packet 421 based on the audio signal 411 and a video packet 423 based on the video signal 413 at the time of generating a transmission stream 420, and generate an augmented metadata packet 425 based on an augmented metadata 415. For example, as shown in FIG. 4, a scheduling is performed in order of an audio packet 412-1, a video packet 423-1, a video packet 423-2, an augmented metadata packet 425-1, an audio packet 421-2, a video packet 423-3, and an augmented metadata packet 425-2 based on the time stamp information.

Augmented Metadata

Figure 5:
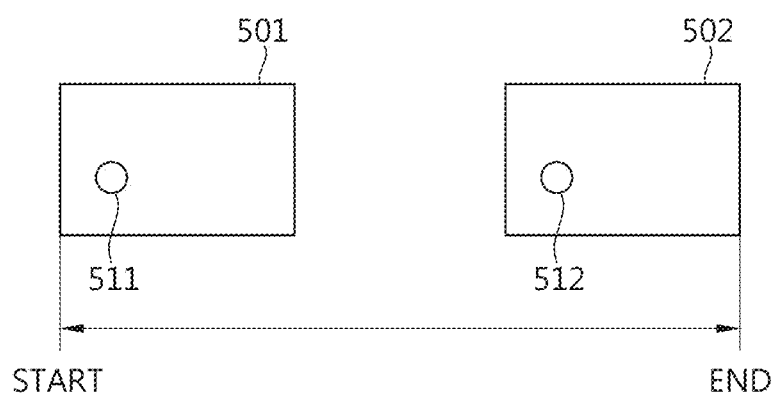
FIG. 5 is a conceptual diagram of augmented area information included in augmented metadata according to an exemplary embodiment of the present invention.
Figure 6:
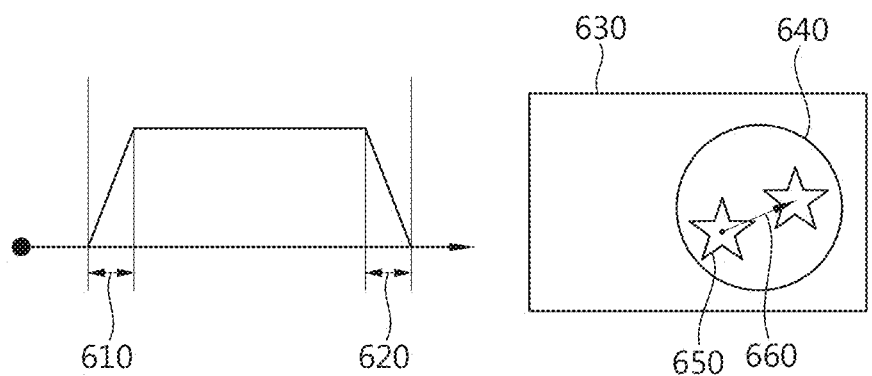
FIG. 6 is a conceptual diagram of augmented object representation information included in the augmented metadata according to the exemplary embodiment of the present invention.

FIG. 5 is a conceptual diagram of augmented area information included in augmented metadata according to an exemplary embodiment of the present invention and FIG. 6 is a conceptual diagram of augmented object representation information included in the augmented metadata according to the exemplary embodiment of the present invention.

Contents of the augmented metadata used in an exemplary embodiment of the present invention will be described with reference to FIGS. 1, 5, and 6. The augmented metadata directs information on the augmented area 131 that means a spatio-temporal area in which the augmented contents are displayed on the broadcast contents 110 as described above. Therefore, the augmented metadata may include an augmented area ID, augmented area space information, and augmented area time information. In addition, the augmented metadata include the information on the augmented contents to be displayed in the augmented area and therefore, may include augmented content information, augmented content representation information, or augmented content interaction information.

Here, the augmented content representation information includes at least one of a size, a font, a color, transparency, and a fade in or fade out effect displaying the augmented contents in the augmented area and the augmented content interaction information may include an input method of a user and event information generated by the input method.

In detail, the augmented area ID means an ID that differentiates each augmented area. A plurality of augmented areas may also be present within one broadcast contents and therefore, each augmented area may be differentiated by assigning the ID to the augmented area.

The augmented area space information means a specific area to be displayed by overlapping the augmented contents on a screen of the broadcast contents. That is, a specific area 511 may be designated on a screen 501 of the broadcast contents or a specific area 512 may be designated on a screen 502 of the broadcast contents. As shown in FIG. 1, the augmented area 131 may also mean the specific area such as a picket held by the character of the drama. The space information includes all of a size, a position, a slope, and the like, from a frame in which the augmented area starts to a frame in which the augmented are ends.

The augmented area time information indicates the information (start/end) on the time from the frame 501 in which the augmented area starts to the frame 502 in which the augmented area ends. The augmented contents are represented in the augmented area for the time.

The augmented contents information means reference information and capacity/size information (max/min byte, horizontal×vertical pixel) on the augmented contents to be displayed in the augmented area. There may be three methods of referencing the augmented contents in the augmented metadata.

First, a method of including the augmented contents in the augmented metadata is advantageous when the size of the augmented contents is not large and the representation synchronization of the augmented contents is very important.

Second, a method of including an URL for the augmented contents in the augmented metadata is a method of actually fetching the augmented contents from the terminal through a link. The method is appropriate when the size of the augmented contents is increased and thus, the augmented contents are hardly included in the augmented metadata. However, the augmented contents are fetched from a remote server and therefore, the fetched delay time needs to be considered.

Third, a method for determining augmented contents at a terminal end without defining the augmented contents in the augmented metadata is used. In the case of the exemplary embodiment of the present invention, the augmented contents may be determined as the viewer desired contents and therefore, the above-mentioned method that does not define the augmented contents from the augmented metadata is used. However, the broadcast terminal apparatus for generating augmented content information term at the time of generating augmented metadata and registering augmented contents may include detailed reference information by modifying the augmented metadata.

The augmented contents representation information includes information on various representation methods when the augmented contents are displayed in the augmented area. For example, the augmented contents representation information includes may include option information, a font or a color, transparency of the augmented object so as to fully display an augmented object in the augmented area or maintain and display a size of original augmented contents, a fade in 610 so as to make the augmented object slowly appear, or otherwise, a fade out 620 information so as to make the augmented object slowly disappear, or moving information 660 to move augmented contents 650 within an augmented area 640 of a broadcast content screen 630, and the like.

The augmented content interaction information defines the augmented contents to which the user interaction can be applied. The augmented content interaction information may include the input method of the user and the event information generated by the input method. For example, the augmented content interaction information may include information on an augmented content display end, a second augmented content display, an Internet URL display capable of searching associated information, or events such as access, and the like, that are generated by the input method by designating the input method of the user such as click, double click, drag, and the like.

The input unit is not limited to a typical input unit such as a remote controller, a mouse, and the like but various input units such as voice recognition through a mike, operation recognition through a sensor, and the like, can be used.

Method for Providing Augmented Contents

Figure 7:
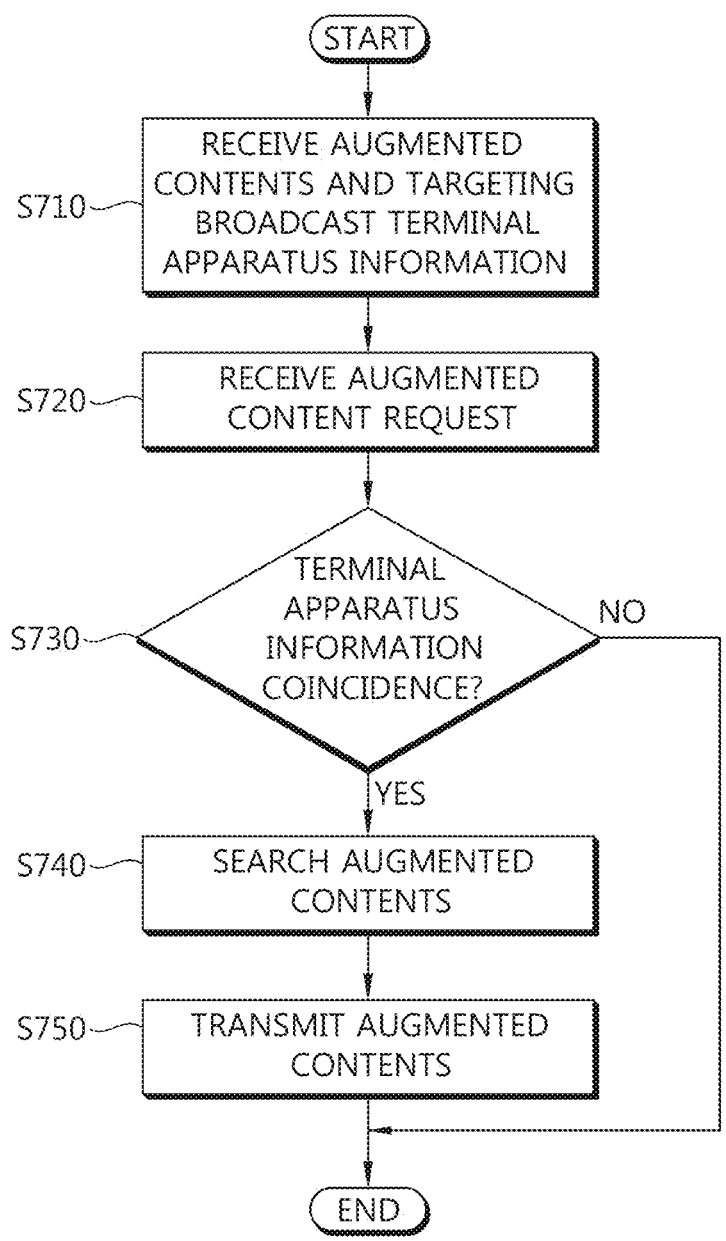
FIG. 7 is a flow chart of a method for transmitting augmented contents according to the exemplary embodiment of the present invention.

FIG. 7 is a flow chart of a method for providing augmented contents according to an exemplary embodiment of the present invention.

As shown in FIG. 7, a method for providing augmented contents according to an exemplary embodiment of the present invention may include: receiving augmented contents to be displayed in an augmented area of broadcast contents and targeting broadcast terminal apparatus information transmitting the augmented contents from a first broadcast terminal apparatus (S710); receiving an augmented content request requesting the augmented contents from a second broadcast terminal apparatus (S720); determining whether a terminal apparatus directed by a targeting broadcast terminal apparatus information coincides with the second broadcast terminal apparatus transmitting the augmented content request (S730); searching the augmented contents corresponding to the augmented content request (S740); and transmitting the augmented contents to the second broadcast terminal apparatus (S750).

Describing in more detail, the augmented contents and the targeting broadcast terminal apparatus information including the broadcast terminal apparatus information used by the second viewer wanting to show the augmented contents are received from the first broadcast terminal apparatus used by the first viewer directly selecting the augmented contents displayed in the augmented area of the broadcast contents and showing the selected augmented contents to the other specific second viewer (S710). The augmented contents and the targeting broadcast terminal apparatus information may be stored in a storage unit.

Next, the augmented content request requesting the augmented contents based on the augmented metadata is received from the second broadcast terminal apparatus receiving the broadcast contents and the augmented metadata from the broadcast content transmitting apparatus (S720). The augmented contents need to be transmitted only to the specific targeting broadcast terminal apparatus and therefore, it is determined whether the terminal apparatus directed by the targeting broadcast terminal apparatus information coincides with the second broadcast terminal apparatus transmitting the augmented content request by an authentication procedure for the second broadcast terminal apparatus transmitting the augmented content request (S730).

When the authentication procedure succeeds, the augmented contents corresponding to the augmented content request is searched (S740) and the searched augmented contents are transmitted to the second broadcast terminal apparatus (S750). When the authentication procedure does not succeed, the procedure ends without performing the searching and transmitting of the augmented contents. In some cases, the transmitting of the separate authentication failure message and the determining whether it coincides with the terminal apparatus information may be repeatedly performed.

Here, the transmitting of the augmented contents to the second broadcast terminal apparatus ends before the second broadcast terminal apparatus starts to receive the broadcast contents. That is, the second broadcast terminal apparatus may request the augmented contents for the second broadcast contents to be reproduced after a predetermined time elapses, rather than for the currently reproduced broadcast contents and the second broadcast terminal apparatus may complete the transmission of the augmented contents before the second broadcast contents start to receive. Even when the connection between the augmented content providing apparatus and the second broadcast terminal apparatus is unexpectedly delayed or impossible, it is possible to stably reproduce the augmented contents.

Here, the targeting broadcast terminal apparatus information includes at least one of the single individual broadcast terminal apparatus information, a plurality of individual broadcast terminal apparatus information, and similar terminal apparatus group category information.

The single individual broadcast terminal apparatus information designates only one specific broadcast terminal apparatus so as to allow only one specific broadcast terminal apparatus to receive the augmented contents and the plurality of individual broadcast terminal apparatus information may designate the specific individual broadcast terminal apparatus but designate the plurality of broadcast terminal apparatuses. For example, broadcast terminal apparatuses A, B, C, and D may be designated together.

The similar terminal apparatus group category categorizes and stores the terminal apparatus group having a series of common characteristics and when only the category information is included in the targeting broadcast terminal apparatus information, the augmented contents can be transmitted to all the broadcast terminal apparatuses included in the category For example, an augmented broadcast service provider may receive personal information input for providing customized information at the time of membership and generates categories for each occupation of users of the broadcast terminal apparatuses or generates categories based on tastes, interest fields, or ages, and as a result, the desired augmented contents can be provided to the broadcast terminal apparatus used by users having common characteristics. The message transmission among persons and the customized advertisement providing service can be provided, thereby creating additional profits.

In some cases, the targeting broadcast terminal apparatus information may include any broadcast terminal apparatus information designating any broadcast terminal apparatus requesting the reception of the augmented contents. In the case of the broadcast terminal apparatus requesting the reception of the augmented contents, it is a method designated to receive the augmented contents without performing a special authentication procedure. According to the setting, when the broadcast terminal apparatus requesting the augmented contents is designated by the individual broadcast terminal apparatus information and any broadcast terminal apparatus information, the augmented contents designated by the individual broadcast terminal apparatus information may be first received.

Method for Receiving Augmented Broadcast Contents

Figure 8:
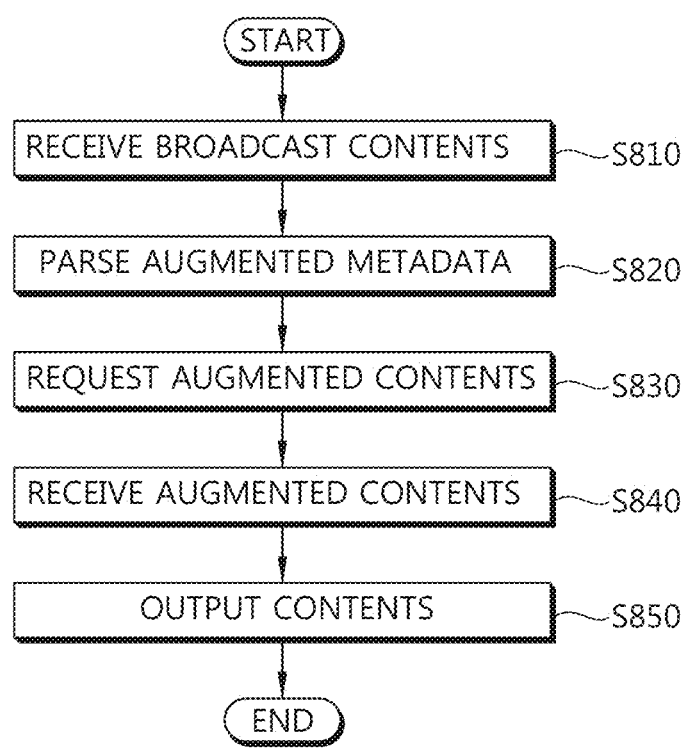
FIG. 8 is a flow chart of a method for receiving augmented broadcast contents according to an exemplary embodiment of the present invention.

FIG. 8 is a flow chart of a method for receiving augmented broadcast contents according to an exemplary embodiment of the present invention. The foregoing second broadcast terminal apparatus receives the augmented broadcast contents.

As shown in FIG. 8, the method for receiving augmented broadcast contents according to an embodiment of the present invention may include: receiving broadcast contents and augmented metadata from a broadcast information providing apparatus (S810); parsing the augmented metadata (S820); transmitting an augmented content request requesting designated augmented contents in the augmented metadata to the augmented content providing apparatus (S830); receiving the augmented contents from the augmented content providing apparatus (S840); and outputting the received broadcast contents and outputting the received augmented contents to an augmented area of the broadcast contents based on information included in the augmented metadata (S850).

Here, the outputting of the broadcast contents and the augmented contents (S850) transmits the broadcast contents and the output information of the augmented contents to the separate output apparatus.

Method for Registering Augmented Contents

Figure 9:
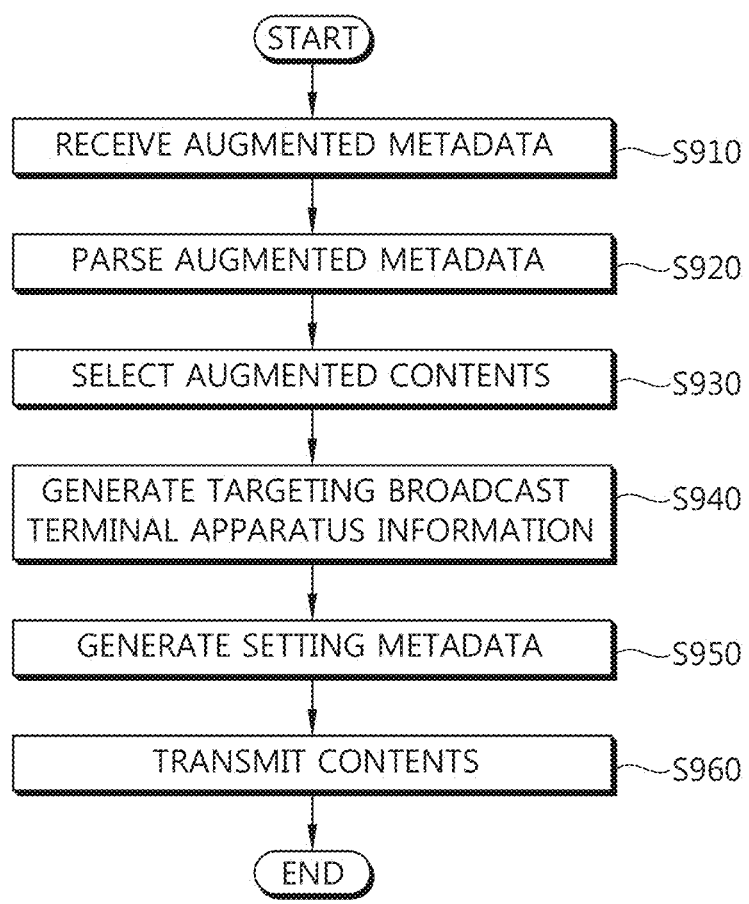
FIG. 9 is a flow chart of a method for registering augmented contents according to an exemplary embodiment of the present invention.
Figure 10:
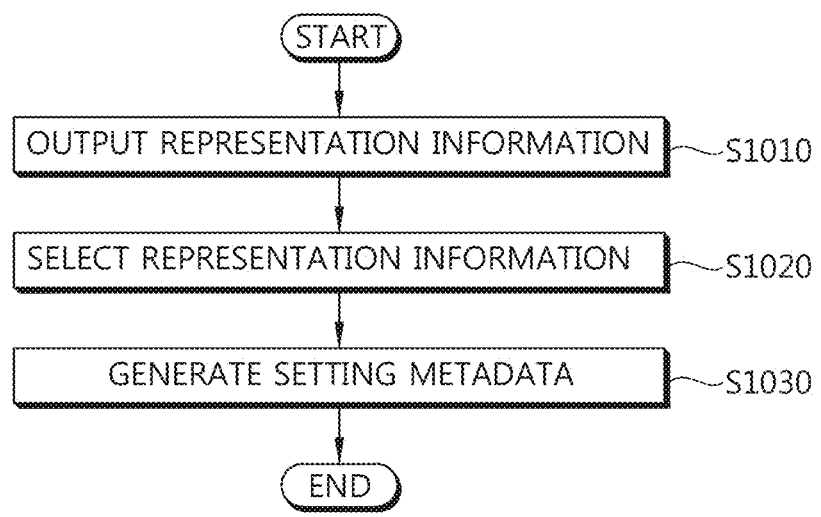
FIG. 10 is a detailed flow chart of a process of generating setting metadata shown in FIG. 9.

FIG. 9 is a flow chart of a method for registering augmented contents according to an exemplary embodiment of the present invention and FIG. 10 is a detailed flow chart of a process of generating setting metadata shown in FIG. 9. The first broadcast terminal apparatus registers the augmented contents.

As shown in FIG. 9, a method for registering augmented contents according to an exemplary embodiment of the present invention may include: receiving augmented metadata from a broadcast contents providing apparatus (S910); parsing the augmented metadata (S920); selecting augmented contents based on the metadata (S930); generating targeting broadcast terminal apparatus information directing a targeting broadcast terminal apparatus transmitting the augmented contents (S940); generating setting metadata designating a method for representing the augmented contents in an augmented area of the broadcast contents based on the augmented metadata (S950); and transmitting the augmented contents, the targeting broadcast terminal apparatus information, and the setting metadata to the augmented contents providing apparatus (S960).

In detail, the augmented metadata regarding the broadcast contents are first received from the broadcast contents providing apparatus (S910). As described above, the augmented metadata directs information on the augmented area 131 that means a spatio-temporal area in which the augmented contents are displayed on the broadcast contents 110. Therefore, the augmented metadata may include an augmented area ID, augmented area space information, and augmented area time information. In addition, the augmented metadata include the information on the augmented contents to be displayed in the augmented area and therefore, may include augmented content information, augmented content representation information, or augmented content interaction information.

Here, the augmented content representation information includes at least one of a size, a font, a color, transparency, and a fade in or fade out effect displaying the augmented contents in the augmented area and the augmented content interaction information may include an input method of a user and event information generated by the input method. Therefore, the information on the augmented area ID, the augmented area spatial information, the augmented area time information, and the like, is acquired through the parsing of the augmented metadata (S920) and the augmented contents to be displayed in the augmented area is selected based on the information (S930). The augmented contents may include a variety of multimedia information such as image, text, moving picture, and the like.

When the augmented contents to be transmitted are selected, the broadcast terminal apparatus on which the augmented contents are displayed needs to be specified and the broadcast terminal apparatus to which augmented contents are transmitted is defined as the targeting broadcast terminal apparatus. The targeting broadcast terminal apparatus information directing the targeting broadcast terminal apparatus to which the augmented contents are transmitted is generated (S940). Meanwhile, in some cases, when the broadcast terminal apparatus directly sets a method for representing the augmented contents on the augmented area of the broadcast contents, it is possible to more efficiently deliver information. Therefore, the setting metadata designating the method for representing the augmented contents in the augmented area of the broadcast contents based on the augmented metadata are generated (S950).

As shown in FIG. 10, the generating of the setting metadata includes: outputting all the selectable augmented content representation information based on the augmented metadata (S1010); selecting at least one of the augmented content representation information through the user interface (S1020); and generating the setting metadata based on the selected results (S1030).

In detail, the augmented metadata include the information on the augmented contents to be displayed in the augmented area and therefore, may include augmented content information, augmented content representation information, or augmented content interaction information.

Here, the augmented content representation information includes at least one of a size, a font, a color, transparency, and a fade in or fade out effect displaying the augmented contents in the augmented area and the augmented content interaction information may include an input method of a user and event information generated by the input method. Therefore, all the selectable augmented content representation information (for example, a size, a font, a color, transparency, a fade in or fade out effect displaying the augmented contents in the augmented area) based on the augmented metadata is output so as to be able to be viewed by users (S1010).

Thereafter, at least one of the output augmented contents representation information is selected through the user interface (S1020) and the setting metadata in which each item of the metadata is finally determined are generated by specifying the method for representing the augmented contents on the augmented area of the broadcast contents based on the selected results (S1030).

When the setting metadata are generated as described above, the augmented contents, the targeting broadcast terminal apparatus information, and the setting metadata are transmitted to the augmented content providing apparatus (S960).

Broadcast Content Providing Apparatus

Figure 11:
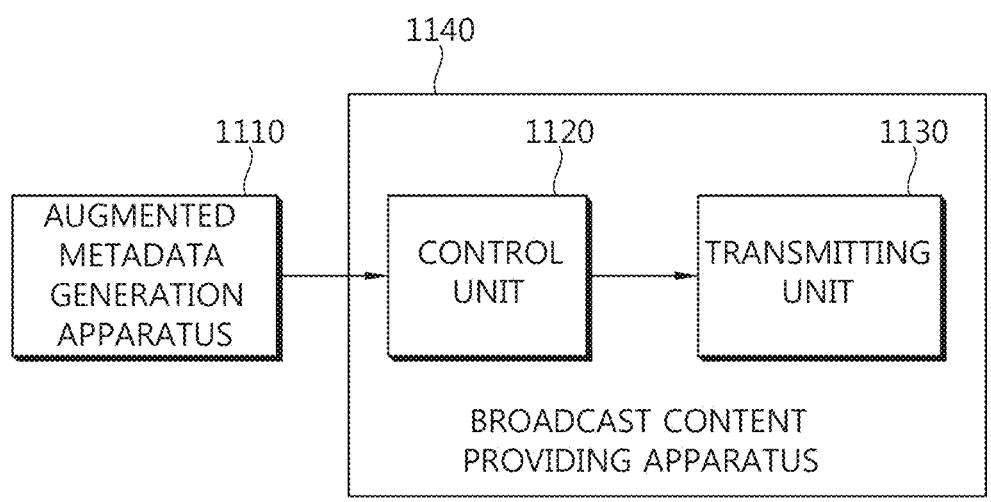
FIG. 11 is a configuration diagram of a broadcast content providing apparatus according to an exemplary embodiment of the present invention.

FIG. 11 is a configuration diagram of an apparatus for providing broadcast contents according to an exemplary embodiment of the present invention.

As shown in FIG. 11, a broadcast content providing apparatus 1140 according to an exemplary embodiment of the present invention includes: a control unit 1120 that receives augmented metadata from an augmented metadata generation apparatus 1110 to generate broadcast content streams based on the broadcast contents and generates augmented metadata streams based on the augmented metadata and a transmitting unit 1130 transmitting the broadcast content streams and the augmented metadata streams received from the control unit 1120 to the broadcast terminal apparatus.

In this configuration, the augmented metadata generation apparatus 1110 generates the augmented metadata that designates the specific spatio-temporal of the broadcast contents as the augmented area and transmits the augmented metadata to the control unit 1120 of the broadcast content providing apparatus 1140. In some cases, the augmented metadata generation apparatus 1110, which is the augmented metadata generation unit performing the same function, may be included in the broadcast content providing apparatus.

Augmented Content Providing Apparatus

Figure 12:
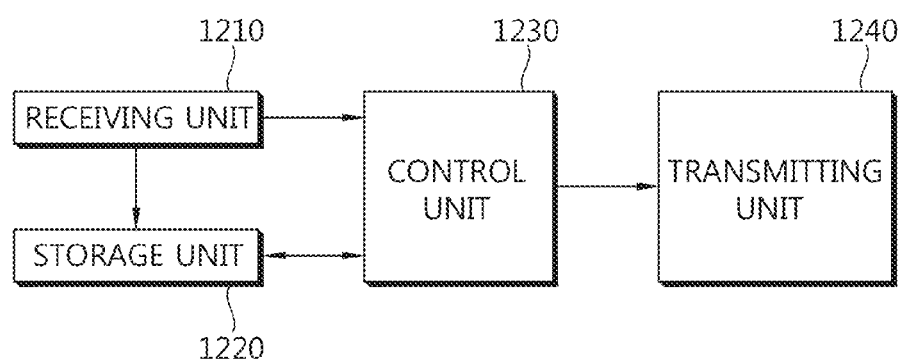
FIG. 12 is a configuration diagram of an augmented content providing apparatus according to an exemplary embodiment of the present invention.

FIG. 12 is a configuration diagram of an apparatus for providing augmented contents according to an exemplary embodiment of the present invention.

As shown in FIG. 12, an augmented content providing apparatus according to an exemplary embodiment of the present invention includes: a receiver 1210 that receives augmented contents to be displayed in an augmented area of broadcast contents and targeting broadcast terminal apparatus information transmitting the augmented contents from a first broadcast terminal apparatus and receives an augmented content request requesting the augmented contents from a second broadcast terminal apparatus; a storage unit 1220 that stores the augmented contents and the targeting broadcast terminal apparatus information; a control unit 1230 that determines whether a terminal apparatus directed by the targeting broadcast terminal apparatus information coincides with a second broadcast terminal apparatus transmitting the augmented content request and searches the augmented contents corresponding to the augmented content request in the storage unit; and a transmitting unit 1240 that transmits the augmented contents to the second broadcast terminal apparatus.

Here, the targeting broadcast terminal apparatus information includes at least one of the single individual broadcast terminal apparatus information, a plurality of individual broadcast terminal apparatus information, and the similar terminal apparatus group category information.

Further, the targeting broadcast terminal apparatus information may include any broadcast terminal apparatus information designating any broadcast terminal apparatus requesting the reception of the augmented contents.

Augmented Broadcast Content Receiving Apparatus

Figure 13:
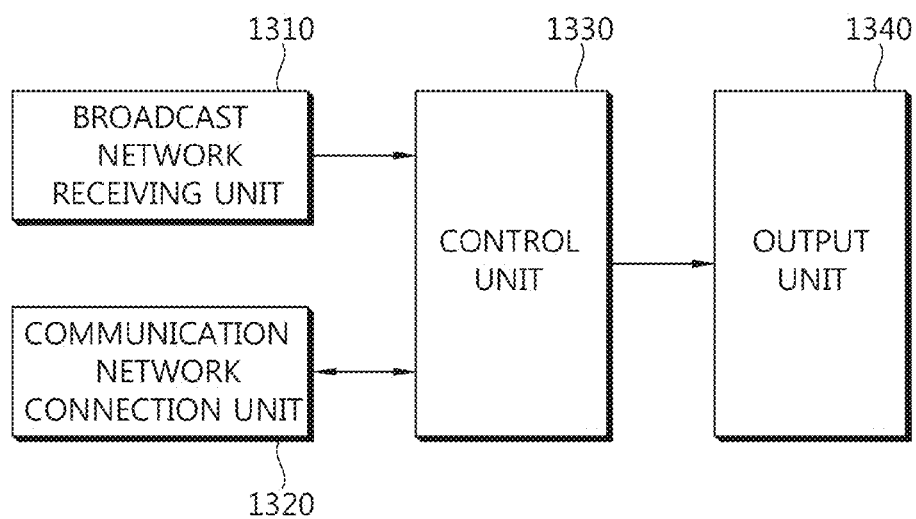
FIG. 13 is a configuration diagram of an augmented broadcast content receiving apparatus according to an exemplary embodiment of the present invention.

FIG. 13 is a configuration diagram of an augmented broadcast content receiving apparatus according to an exemplary embodiment of the present invention.

As shown in FIG. 13, an apparatus for receiving augmented broadcast contents according to an exemplary embodiment of the present invention includes: a broadcast network receiving unit 1310 that receives broadcast contents and augmented metadata from a broadcast information providing apparatus and transmits the broadcast contents and the augmented metadata to a control unit; a control unit 1330 that parses the augmented metadata; a communication network connection unit 1320 that transmits an augmented content request requesting augmented contents designated in the augmented metadata to the augmented content providing apparatus and receives the augmented contents from the augmented content providing apparatus; and an output unit 1340 that displays the received broadcast contents corresponding to a control of the control unit and displays the received augmented contents in the augmented area of the broadcast contents based on the information included in the augmented metadata.

Augmented Content Registration Apparatus

Figure 14:
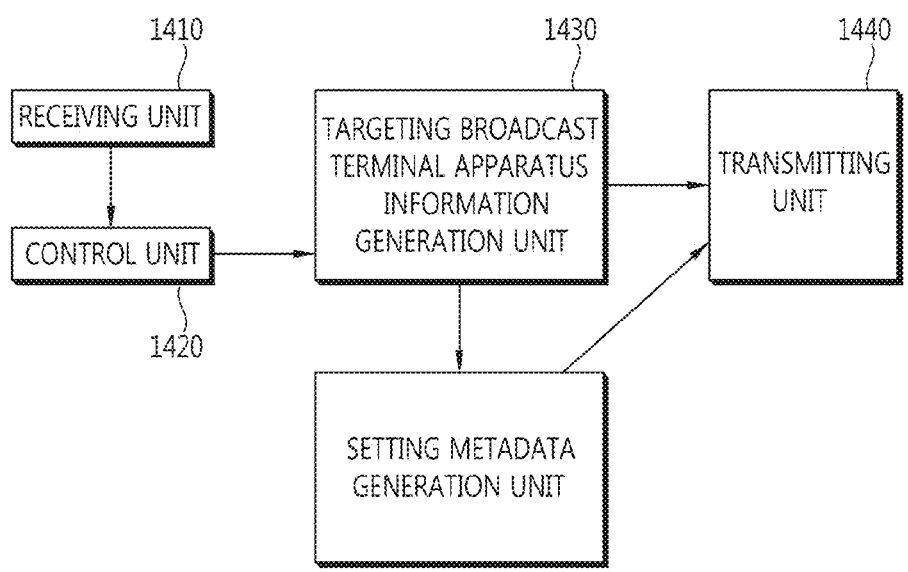
FIG. 14 is a configuration diagram of an augmented contents registration apparatus according to an exemplary embodiment of the present invention.
Figure 15:
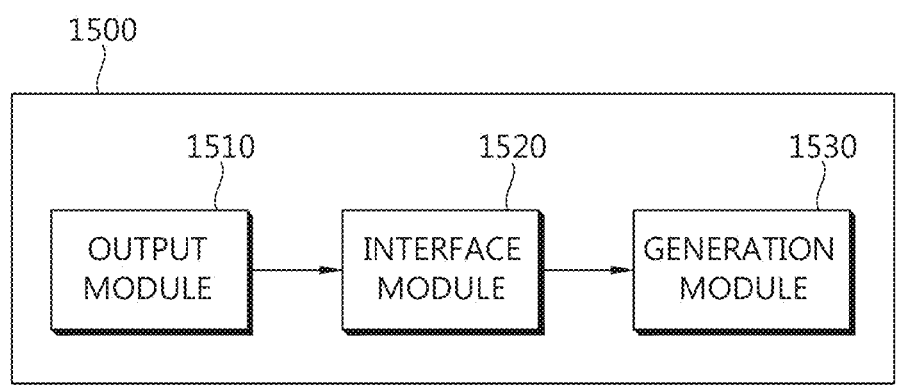
FIG. 15 is a detailed configuration diagram of a setting metadata generation unit shown in FIG. 14.

FIG. 14 is a configuration diagram of an augmented content registration apparatus according to an exemplary embodiment of the present invention and FIG. 15 is a detailed flow chart of a setting metadata generation unit shown in FIG. 14. The first broadcast terminal apparatus may serve as the augmented content registration apparatus.

As shown in FIG. 14, an augmented content registration apparatus according to an exemplary embodiment of the present invention includes: a receiving unit 1410 that receives augmented metadata from a broadcast content providing apparatus; a control unit 1420 that parses the augmented metadata; a targeting broadcast terminal apparatus information generation unit 1430 that generates targeting broadcast terminal apparatus information directing a targeting broadcast terminal apparatus transmitting augmented contents; a setting metadata generation unit 1450 that generates setting metadata designating a method for representing the augmented contents in the augmented area of the broadcast contents based on the augmented metadata; and a transmitting unit 1440 that transmits the setting metadata, the augmented contents, and the targeting broadcast terminal apparatus information to the augmented content providing apparatus.

In this configuration, the setting metadata generation unit 1450 may include: an output module 1451 that outputs all the selectable augmented content representation information based on the augmented metadata; an interface module 1452 that selects at least one of the augmented content representation information through a user interface; and a generation module 1453 that generates the setting metadata based on the selected results.

According to the method for providing targeting information and the apparatus performing the same as described above, unlike providing only the additional information intended by the producer of the broadcast contents according to the related art, it is possible to designate the specific time and area in the broadcast programs viewed by unspecific viewers and allow the specific viewers to display the desired information to other targeted viewers through the designated area of the broadcast programs in the designated area and time.

Therefore, it is possible to provide information appropriate for users and satisfy the viewer demand wanting various contents. Further, it is possible to more efficiently deliver information by attracting the viewer interest by delivering the messages to be delivered to the specific viewers using the broadcast contents. Meanwhile, the targeting augmented broadcasting can be applied to overall industries using the broadcast programs, such as a broadcast provider, an advertising provider, a content provider, and the like, and can increase the broadcast program participation of the viewer to create the additional profits of the broadcast programs.

What is claimed is:

1. A method for providing augmented contents, comprising:
   receiving augmented contents to be displayed in an augmented area of broadcast contents and targeting broadcast terminal apparatus information transmitting the augmented contents from a first broadcast terminal apparatus;
   receiving an augmented content request requesting the augmented contents from a second broadcast terminal apparatus;
   determining whether the terminal apparatus directed by a targeting broadcast terminal apparatus information coincides with the second broadcast terminal apparatus transmitting the augmented content request;
   searching the augmented contents corresponding to the augmented content request; and
   transmitting the augmented contents to the second broadcast terminal apparatus.

2. The method of claim 1, wherein the targeting broadcast terminal apparatus information includes at least one of single individual broadcast terminal apparatus information, a plurality of individual broadcast terminal apparatus information, and similar terminal apparatus group category information.

3. The method of claim 1, wherein the targeting broadcast terminal apparatus information includes any broadcast terminal apparatus information designating any broadcast terminal apparatus requesting the reception of the augmented contents.

4. The method of claim 1, wherein the transmitting of the augmented contents to the second broadcast terminal apparatus ends before the second broadcast terminal apparatus starts to receive the broadcast contents.

5. A method for registering augmented contents, comprising:
   receiving augmented metadata from a broadcast contents providing apparatus;
   parsing the augmented metadata;
   selecting augmented contents based on the parsed augmented metadata;

generating targeting broadcast terminal apparatus information directing a targeting broadcast terminal apparatus transmitting the augmented contents; and transmitting the augmented contents and the targeting broadcast terminal apparatus information to an augmented contents providing apparatus.

6. The method of claim 5, wherein the augmented metadata includes at least one of an augmented area ID, augmented area space information, augmented area time information, augmented content information, augmented content representation information, and augmented content interaction information.

7. The method of claim 6, wherein the augmented content representation information includes at least one of a size, a font, a color, transparency, and a fade in or fade out effect displaying the augmented contents in the augmented area, and the augmented content interaction information includes an input method of a user and event information generated by the input method.

8. The method of claim 5, further comprising:

generating the setting metadata designating a method for representing augmented contents in the augmented area of the broadcast contents based on the augmented metadata, wherein in the transmitting of the augmented contents and the targeting broadcast terminal apparatus information to the augmented content providing apparatus, the setting metadata is further transmitted to the augmented content providing apparatus.

9. The method of claim 8, wherein the generating of the setting metadata includes:

outputting all the selectable augmented content representation information based on the augmented metadata;

selecting at least one of the augmented content representation information through a user interface; and generating the setting metadata based on selected results.

10. An augmented content providing apparatus, comprising:

a receiver that receives augmented contents to be displayed in an augmented area of broadcast contents and targeting broadcast terminal apparatus information transmitting the augmented contents from a first broadcast terminal apparatus and receives an augmented content request requesting the augmented contents from a second broadcast terminal apparatus;

a storage unit that stores the augmented contents and the targeting broadcast terminal apparatus information;

a control unit that determines whether a terminal apparatus directed by the targeting broadcast terminal apparatus information coincides with a second broadcast terminal apparatus transmitting the augmented content request and searches the augmented contents corresponding to the augmented content request in the storage unit; and a transmitting unit that transmits the augmented contents to the second broadcast terminal apparatus.

11. The augmented content providing apparatus of claim 10, wherein the targeting broadcast terminal apparatus information includes at least one of the single individual broadcast terminal apparatus information, a plurality of individual broadcast terminal apparatus information, and similar terminal apparatus group category information.

12. The augmented content providing apparatus of claim 10, wherein the targeting broadcast terminal apparatus information includes any broadcast terminal apparatus information designating any broadcast terminal apparatus requesting the reception of the augmented contents.

13. The augmented content providing apparatus of claim 10, wherein the transmitting unit ends the transmission of the augmented contents before the second broadcast terminal apparatus starts the reception of the broadcast contents.

14. A broadcast terminal apparatus, comprising:

a receiving unit that receives augmented metadata from a broadcast content providing apparatus;

a control unit that parses the augmented metadata and selects the augmented contents based on the parsed augmented metadata;

a targeting broadcast apparatus terminal information generation unit that generates targeting broadcast terminal apparatus information directing a targeting broadcast terminal apparatus transmitting the augmented contents; and a transmitting unit that transmits the augmented contents and the targeting broadcast terminal apparatus information to an augmented content providing apparatus.

15. The broadcast terminal apparatus of claim 14, wherein the augmented metadata includes at least one of an augmented area ID, augmented area space information, augmented area time information, augmented content information, augmented content representation information, and augmented content interaction information.

16. The broadcast terminal apparatus of claim 15, wherein the augmented content representation information includes at least one of a size, a font, a color, transparency, and a fade in or fade out effect displaying the augmented contents in the augmented area, and the augmented content interaction information includes an input method of a user and event information generated by the input method.

17. The broadcast terminal apparatus of claim 14, further comprising:

a setting metadata generation unit that generates the setting metadata designating a method for representing augmented contents in the augmented area of the broadcast contents based on the augmented metadata, wherein the transmitting unit further transmits the setting metadata to the augmented content providing apparatus.

18. The broadcast terminal apparatus of claim 17, wherein the setting metadata generation unit includes:

an output module that outputs all the selectable augmented content representation information based on the augmented metadata;

an interface module that selects at least one of the augmented content representation information through a user interface; and a generation module that generates the setting metadata based on selected results.

* * * * *